*T. Mabbett, Sr.,*
*Cultivator.*
*No. 102,841.*  *Patented May 10, 1870.*
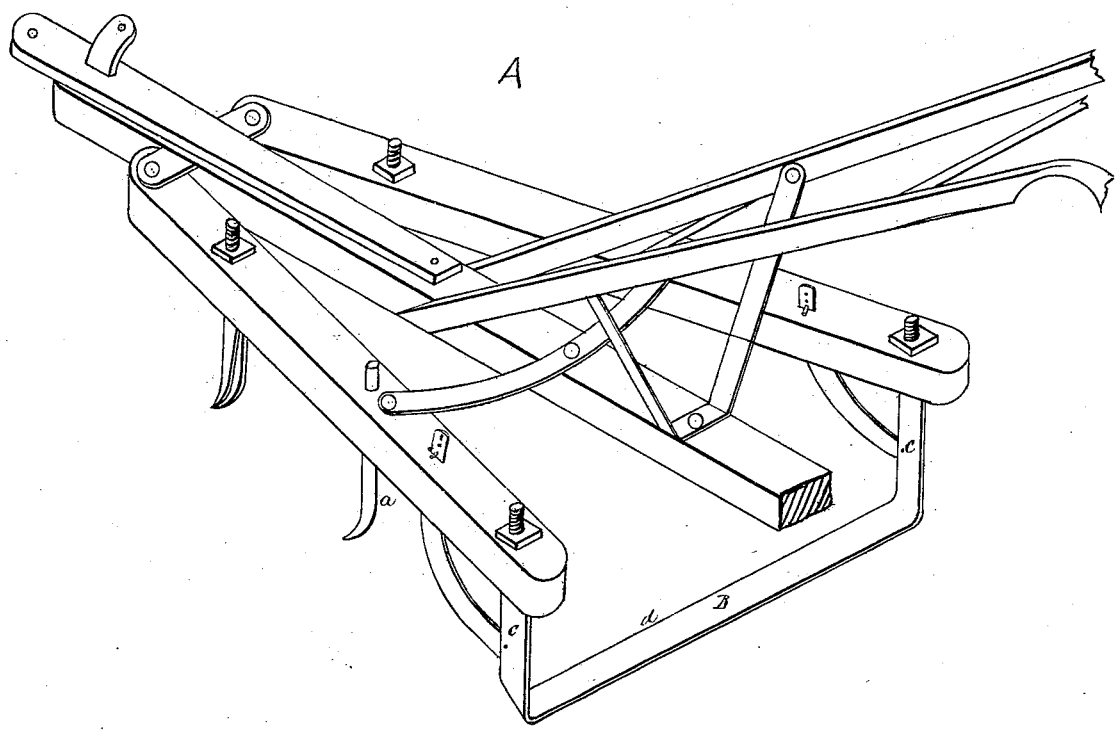
Witnesses
Charles H. Lavis
L. Bones
Inventor
Truman Mabbett, Sr.
by his Attorney Francis D. Pastorius

UNITED STATES PATENT OFFICE.

TRUMAN MABBETT, SR., OF VINELAND, NEW JERSEY.

IMPROVEMENT IN CULTIVATORS.

Specification forming part of Letters Patent No. 102,841, dated May 10, 1870.

*To all whom it may concern:*

Be it known that I, TRUMAN MABBETT, Sr., of Vineland, in the county of Cumberland and State of New Jersey, have invented a new and useful Improvement in Cultivators; and I do hereby declare that the following is a full, clear, and exact description of the same, reference being had to the accompanying drawing, and to the letters of reference marked thereon.

My invention consists in the use and application, in cultivators, of a cutting-bar knife or skimmer, which is applied transversely at the rear end of the same, for the purpose hereinafter shown and described.

A is a cultivator of the pattern ordinarily in use. To the rear of it, behind the tines or teeth $a$, a cutting-bar or skimmer, B, is suspended by the pendants $c$ $c$, which are formed in this instance with square shoulders and secured to the frame by means of screws and nuts. The front edge, $d$, of the cutting-bar or skimmer forms a knife-edge, and takes under the soil at the same depth as the tines $a$, but by suitable mechanism its depth of penetration can be made to vary and be regulated with the greatest nicety.

My invention is for the purpose of following the tines or teeth, cutting and loosening all roots, and cleaning away weeds and rubbish. It has been found greatly to facilitate the working of land, bringing it to a proper state of cultivation, and lessening the expense of tillage by mechanical aid.

My improvement does not in the least interfere with the proper working of a cultivator. The person operating it has the power of guiding and handling it with ease and safety. It has not only the effect of steadying the cultivator when at work, but is very effective in bringing weeds, &c., to the surface, and thus saves repeated weeding, caused by their growing again when not effectually eradicated. It can be manufactured of various sizes, adapted to the various kinds of plants, systems of husbandry, and to the description of land on which it is to be employed.

What I claim as my invention, and desire to secure by Letters Patent, is—

The combination with a cultivator, of an adjustable cutting-bar or skimmer B, substantially for the purpose shown and described.

In testimony whereof I hereunto sign my name in presence of two subscribing witnesses.

TRUMAN MABBETT, SR.

Witnesses:
  W. A. HOUSE,
  F. S. CHUBBUCKE.